United States Patent
Walz et al.

(10) Patent No.: US 11,678,408 B2
(45) Date of Patent: *Jun. 13, 2023

(54) PTC HEATING ELEMENT AND ELECTRICAL HEATING DEVICE WITH SUCH A PTC HEATING ELEMENT

(71) Applicant: Eberspächer catem GmbH & Co. KG, Herxheim (DE)

(72) Inventors: Kurt Walz, Hagenbach (DE); Patrick Kachelhoffer, Seebach (FR); Sascha Barner, Hagenbach (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 563 days.

This patent is subject to a terminal disclaimer.

(21) Appl. No.: 16/801,954

(22) Filed: Feb. 26, 2020

(65) Prior Publication Data
US 2020/0275529 A1 Aug. 27, 2020

(30) Foreign Application Priority Data
Feb. 26, 2019 (DE) .......................... 102019202543.9

(51) Int. Cl.
| | |
|---|---|
| H05B 3/14 | (2006.01) |
| H05B 3/28 | (2006.01) |
| H05B 3/30 | (2006.01) |
| H05B 1/02 | (2006.01) |
| H05B 3/03 | (2006.01) |
| H05B 3/24 | (2006.01) |
| H05B 3/06 | (2006.01) |

(52) U.S. Cl.
CPC ............. *H05B 1/0294* (2013.01); *H05B 3/03* (2013.01); *H05B 3/06* (2013.01); *H05B 3/24* (2013.01); *H05B 3/30* (2013.01); *H05B 2203/02* (2013.01); *H05B 2203/021* (2013.01)

(58) Field of Classification Search
None
See application file for complete search history.

(56) References Cited

U.S. PATENT DOCUMENTS

| | | | | |
|---|---|---|---|---|
| 5,837,971 A | * | 11/1998 | Lee | ......................... H05B 3/342 |
| | | | | 219/528 |
| 6,300,597 B1 | * | 10/2001 | Lee | ....................... H05B 1/0272 |
| | | | | 219/544 |
| 2008/0099464 A1 | * | 5/2008 | Niederer | ............... F24H 3/0429 |
| | | | | 219/520 |

(Continued)

FOREIGN PATENT DOCUMENTS

| | | |
|---|---|---|
| AT | 005812 | 12/2002 |
| CN | 102714891 | 10/2012 |

(Continued)

*Primary Examiner* — Joseph M. Pelham
(74) *Attorney, Agent, or Firm* — Boyle Fredrickson S.C.

(57) ABSTRACT

A PTC heating element comprises at least one PTC element and two conductor paths which are assigned to different polarities and which are electrically conductively connected to the PTC element and are provided with connection elements for the electrical connection of the PTC element. The PTC heating element has improved heat discharge due to the provision of an electromagnetic shielding which is formed from a fluid-permeable metal structure and which surrounds the PTC element and the conductor paths.

21 Claims, 4 Drawing Sheets

(56) References Cited

U.S. PATENT DOCUMENTS

| | | | | |
|---|---|---|---|---|
| 2013/0134151 | A1* | 5/2013 | Freund | F24H 3/0458 |
| | | | | 219/539 |
| 2018/0156494 | A1* | 6/2018 | Bohlender | F24H 9/1872 |
| 2018/0160476 | A1* | 6/2018 | Bohlender | F24H 1/103 |
| 2018/0160478 | A1* | 6/2018 | Bohlender | F24H 3/0429 |
| 2019/0110339 | A1 | 4/2019 | Duncan et al. | |
| 2020/0166242 | A1 | 5/2020 | Zoske et al. | |
| 2021/0354530 | A1* | 11/2021 | Klingebiel | H05B 3/24 |

FOREIGN PATENT DOCUMENTS

| | | |
|---|---|---|
| CN | 108151290 | 6/2018 |
| DE | 102012013770 | 1/2014 |
| DE | 102016224296 | 6/2018 |
| EP | 2287541 | 2/2011 |

\* cited by examiner

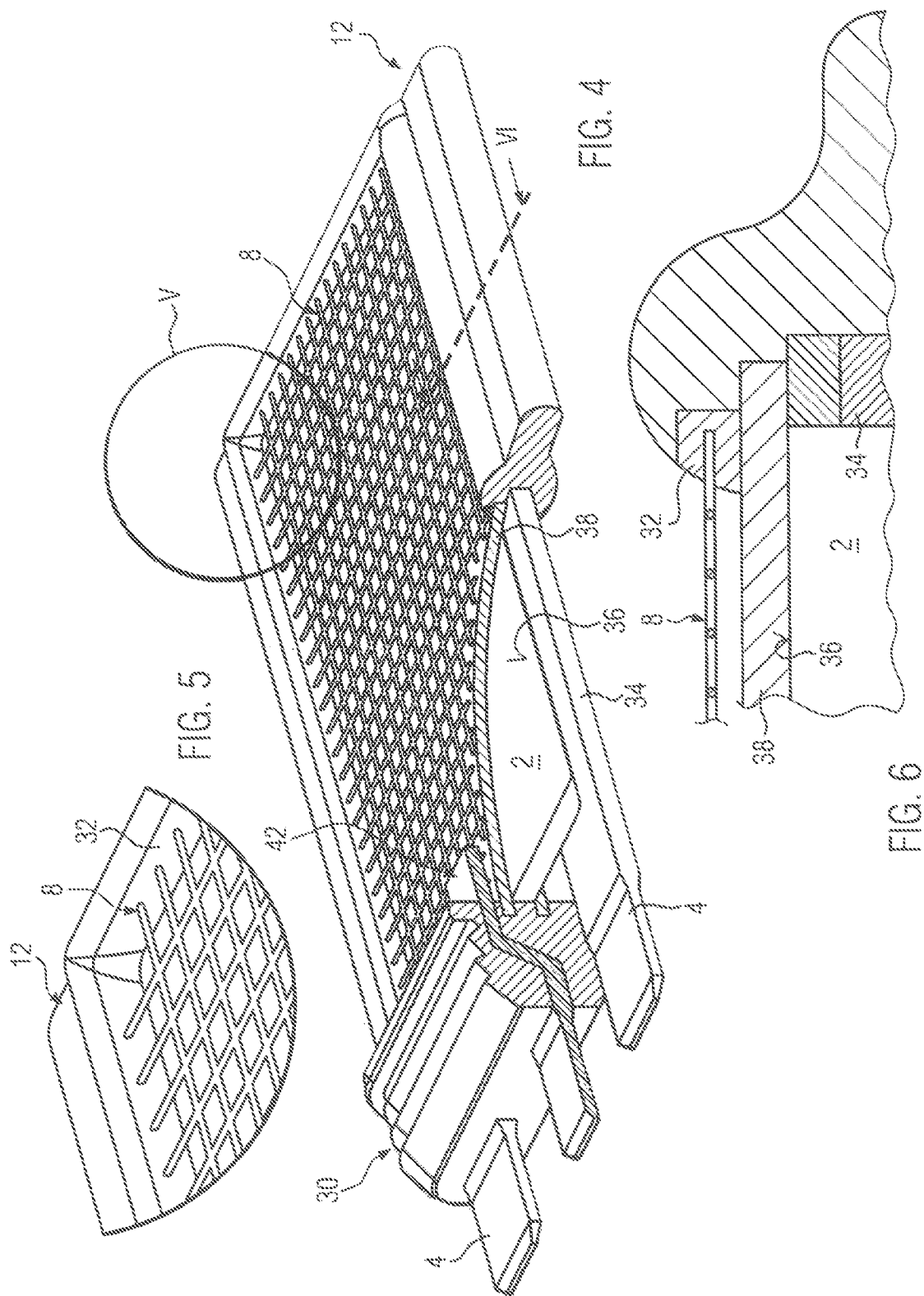

US 11,678,408 B2

PTC HEATING ELEMENT AND ELECTRICAL HEATING DEVICE WITH SUCH A PTC HEATING ELEMENT

BACKGROUND OF THE INVENTION

1. Field of the Invention

The present invention relates to a PTC heating element comprising at least one PTC element and two conductor paths assigned to different polarities, which are electrically conductively connected to the PTC element and provided with connection elements for the electrical connection of the PTC element.

2. Background of the Invention

Such a PTC heating element is known from DE 10 2016 224 296 A1, for example. DE 20 2012 013 770 A1 also discloses a corresponding PTC heating element.

The last-mentioned known PTC heating element comprises two shell elements bent from sheet metal and connected to each other, which surround the PTC heating element on the outside. These two shell elements provide a shielding against EMC radiation. This prevents the electromagnetic radiation emitted by the PTC heating element from reaching the outside.

The state of development discussed above still leaves room for improvement. Thus, the present invention intends to specify a PTC heating element with improved heat output.

SUMMARY

To solve this problem, the present invention proposes a PTC heating element comprising at least one PTC element and two conductor paths which are assigned to different polarities, which are electrically conductively connected to the PTC element, and which are provided with connection elements for the electrical connection of the PTC element. This PTC heating element has a metal structure that is made fluid-permeable and defines an electromagnetic shielding around the PTC element and the conductor paths. The metal structure may be water permeable. The fluid-permeable metal structure offers the possibility that the fluid to be heated can directly reach the heat-emitting surface of the PTC heating element.

In contrast to the prior art according to DE 10 2012 013 770 A1, the heat generated by the PTC element does not first have to pass through a closed shielding shell in order to be transferred to the medium. Preferably, the metal structure surrounds the PTC heating element and the conductor paths as a cage. The metal structure is at ground potential, whereas the two conductor paths are assigned to the potential of the power current.

For heating with the PTC heating element, air or a liquid heat carrier, for example water, can be used. The PTC element can be installed in an air heater so that a corrugated rib layer emitting heat to the air can be applied directly to the metal structure. Any electrical insulation between the electrically conductive components of the PTC heating element, namely the PTC element and the two conductor paths, may be provided within the shielding. This insulation prevents the medium to be heated from coming into direct contact with the electrically conducting components of the PTC heating element that are guiding the power current.

Usually, however, the PTC heating element is used in a water heater which, as a configuration of an electrical heating device, comprises a circulation chamber which can usually be connected to a pipe system by means of inlet and outlet nozzles and is sealed off from a connection chamber so that the connection chamber for the electrical connection of the at least one PTC heating element does not come into contact with the liquid medium to be heated. Moisture or the heat exchanger liquid cannot reach the connection chamber. For this purpose, a partition is provided between the circulation chamber and the connection chamber. This partition is usually penetrated by the connection elements. The connection elements are usually sealingly accommodated in the connection chamber and passed through it. As already known from DE 10 2016 224 296 A1, a heating element housing can here provide a seal against the partition. The circulation chamber of such a specific design of the is fluid-tight except for the inlet and outlet openings, so that the liquid medium to be heated is enclosed in the circulation chamber and can flow through the circulation chamber.

In such a circulation chamber, the PTC heating elements may be exposed in the form of heating ribs. The fluid-permeable metal structure surrounds the heat-emitting surface of the PTC heating element at a small distance so that a flow gap is created between the shielding and the heat-emitting surface. In this flow gap, there is an improved heat transfer compared to known solutions, since the fluid flow is swirled by the metal structure, which leads to an improved heat transfer at the interface, i.e. the heat-emitting surface, of the heat-generating PTC heating element. The shielding may be spaced apart at least in sections from the heat-emitting surface which is connected to the PTC element in a heat-conducting manner. The distance is usually between 1.0 and 4.0 millimeters. Such a distance allows the flow in the gap to be optimally adjusted with regard to the desired intensive heat transfer between the heat-emitting surface and the medium to be heated.

Various metal structures are suitable for the aforementioned effect of a swirling of the fluid to be heated, such as knitted metal fabrics, woven metal fabrics or also expanded metal sheets. Also conceivable are textile structures which contain metallic threads completely or in part, or which possibly also accommodate textile threads therein or are formed by them. The mesh size between individual metallic elements of the fluid-permeable metal structure is determined by the desired effect of the shielding. However, the corresponding mesh size should not be smaller than 1.0 millimeter. For the desired shielding, the individual elements of the metal structure can be brought together as close as desired. Even densely woven metal structures, for example, are basically fluid-permeable. With regard to good convective heat dissipation, a minimum mesh size should not be undercut. The minimum distance of adjacent fiber or thread elements or expanded metal structures of the metal structure should not be less than 1.0 millimeter. The optimum with regard to good swirling to produce turbulent flows at the heat-emitting surface of the PTC element on the one hand and good flowability for convective heat dissipation on the other hand is possible with a mesh size of between 1.5 and 2.0 millimeters, preferably between 3 and 10 millimeters. With regard to stability and, in particular, processability and in consideration of the desired mesh size, the wire thickness should be between 0.2 and 0.5 millimeter. Such wire thicknesses are well woven and are available as standard products. In the undulated range, the wire thickness should be chosen to range from 0.4 to 1 millimeter.

Particularly with a view to easy connection of the PTC heating elements in an electrical heating device, the electrical terminal lugs assigned to the conductor paths are preferably provided on the same sides of the PTC heating element. These terminal lugs extend parallel to each other, so that both terminal lugs can be electrically connected in one plug connection via a uniform plug-in movement. The electrical terminal lugs are preferably made in one piece on contact sheets, which form the two conductor paths. The conductor paths, in turn, lie against the PTC element. They can lie in an electrically conductive manner against a main side surface of the PTC element. They can just as well lie against an end face of the PTC element, as is taught in DE 10 2016 224 296 A1. The PTC heating element can also comprise the plastic frame disclosed in this aforementioned publication as the heating element housing. The fluid-permeable metal structure can be connected to this plastic frame. The heating element housing can, but does not necessarily have to be made of plastic. The heating element housing can also be made of a ceramic material, for example two ceramic shells assigned to each other or a ceramic shell and a ceramic cover, which fluid-tightly accommodate the PTC element and the two conductor paths between them. On the outside, such a heating element housing is preferably surrounded by a cage made of the fluid-permeable metal structure.

With a view to easy and simple connectability of the shielding, it is proposed, to provide a shielding terminal lug connected in an electrically conductive manner to the shielding on that side of the PTC heating element that is also projected over by the electrical terminals lugs, wherein the shielding terminal lug preferably extends parallel to the electrical terminal lugs and projects over the shielding. The shielding terminal lug can be formed from the fluid-permeable metal material. If this is formed by an expanded metal, punching and stretching in the area of the terminal lug can be dispensed with for the formation of the shielding terminal lug, so that the shielding terminal lug is formed in one piece on the expanded metal as a continuous sheet metal segment. The shielding can thus be connected by means of a plug connection.

The fluid-permeable metal structure can, for example, be connected to the heating element housing by overmolding the plastic material forming the heating element housing. Usually, the metal structure is connected to a holding frame which surrounds the metal structure on the outside. This holding frame can be connected to the metal structure by injection molding, for example. Other types of attachment such as gluing, soldering or welding are also conceivable. This holding frame is usually inserted into an injection mold in which the heating element housing is injection molded. The holding frame seals the metal structure, which is provided inside the heating element housing, with respect to the injection mold. The metal structure is usually arranged at a certain distance from the heat-decoupling surface of the PTC heating element during this overmolding, so that after demolding of the heating element housing the PTC heating element is produced off-tool.

The aforementioned partition also may be penetrated by the shielding terminal lug, which is electrically connected to the shielding, so that the electrical connection of the shielding is also made in the connection chamber.

For this purpose, a printed circuit board can preferably be provided in the connection chamber, which comprises plug-in element receptacles for the plug-in-contacting connection of the terminal lugs on the one hand and the at least one shielding terminal lug on the other hand. Preferably, the electrical heating device has a plurality of PTC heating elements of the aforementioned type. In this case, the printed circuit board connects the terminal lugs of these several PTC heating elements. The printed circuit board can be a connection circuit board which is not equipped with electrical components, but merely comprises contact tongue receptacles for making electrical contact with the various electrical connection elements and the shielding terminal lugs. Such a circuit board serves only to group several PTC heating elements in order to combine them in a single heating circuit. The corresponding printed circuit board can of course group different heating circuits with different numbers of PTC elements. In any case, the electrical connection, both for the power current and for the shielding, is preferably made solely via the said circuit board. This significantly reduces the cabling effort within the electrical heating device.

A plurality of PTC heating elements can also be accommodated in a single shielding cage. This creates a uniform shielding for the plurality of PTC heating elements. The shielding cage can here be designed to follow the contours of the individual PTC heating elements as much as possible, so that also in this preferred development the effect of swirling at the interface can be used over a large area for improved heat transfer. The shielding cage can consist of two shell segments, wherein, for example, one of the shell segments can form receptacles for the respective PTC heating elements so that these can be inserted into the corresponding receptacles during assembly before the other element of the shielding cage is placed on the PTC heating elements in order to place the shielding cage as circumferentially as possible around the PTC heating elements.

The electromagnetic shielding that surrounds the PTC element and the conductor paths is usually provided circumferentially around the electrically conductive and energized components of the PTC heater. An underside of the PTC heating element opposite the connection side with the connection elements and optionally the shielding terminal lug can also be surrounded by the fluid-permeable metal structure. With regard to the details of the shielding, the effect of an efficient EMC protection that is to be achieved is of sole importance.

In the case of a plurality of PTC heating elements as a component of the electrical heating device, the shielding terminal lug can be formed by a conductor rail which electrically conductively interconnects the shielding of the plurality of PTC heating elements. In this case, each individual shielding of the PTC heating element is normally without a terminal lug. Rather, the electrically conductive connection of the shielding is made solely via the conductor rail and the shielding terminal lug which is usually formed thereby in one piece.

BRIEF DESCRIPTION OF THE DRAWINGS

Further details and advantages of the present invention will become apparent from the following description of embodiments in conjunction with the drawing, in which:

FIG. 4 is a perspective, partly cut side view of a third embodiment of a PTC heating element;

FIG. 5 shows detail V according to FIG. 4 on an enlarged scale;

FIG. 6 is a sectional view along line VI-VI according to FIG. 4; and

DETAILED DESCRIPTION

Figure 1:
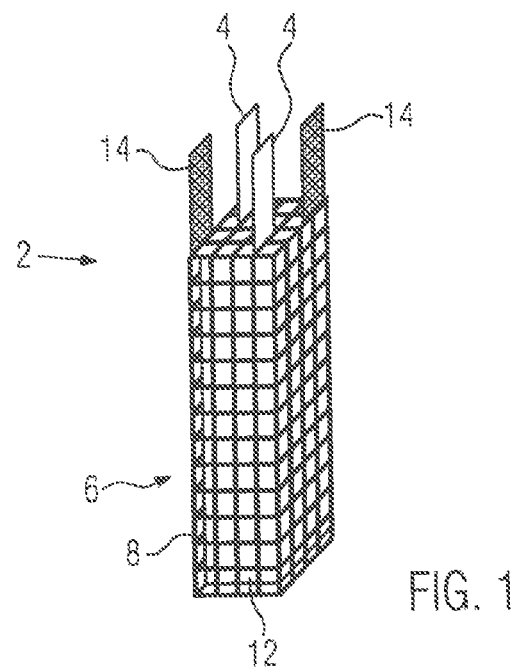
FIG. 1 is a perspective side view of an embodiment of a PTC heating element.

FIG. 1 shows a side view of a PTC heating element 2 with mutually opposite connection elements 4 in the form of metallic terminal lugs, which are formed by free cutting of sheet metal elements which are not shown in more detail and which lie as conductor paths against opposing sides of a PTC element in order to energize it. For details of such a connection of a PTC element, reference is made by way of example to DE 10 2016 224 296 A1. In contrast to the disclosure thereof, the PTC element can be contacted and energized in the present case also via a main side surface. It goes without saying that the PTC element is provided with a vapor-deposited or sputtered metallization opposite the contact surface of the conductor path. The PTC element can be energized with different polarity via the two connection elements 4.

Reference sign 6 marks a cage made of a fluid-permeable metal structure 8, which in the present case completely surrounds the PTC element and the conductor paths. The metal structure 8 is formed by a metal grid in the present case. Behind the metal structure 8, a heating element housing 12 is visible, which seals the conductor paths and the PTC element in a fluid-tight manner. The heating element housing 12 can be formed by a plastic housing frame, which sealingly seals ceramic plates on opposite main side surfaces, which ceramic plates accommodate the at least one PTC element between them, as known from DE 10 2016 224 296 A1. The heating element housing can be a plastic housing. It can be made partly of ceramic and partly of plastic. The heating element housing 12 can just as well be formed from two or more ceramic components which are fluid-tightly interconnected enclosing the PTC element and the two conductor paths.

As shown in FIG. 1, the cage 6 circumferentially extends around the heating element housing 12 when the embodiment is viewed from above (view parallel to the longitudinal extension of the connection elements 4). However, the opposite upper and lower sides of the heating element housing 12 are also surrounded by the metal structure 8. On the upper side, the metal structure 8 is projected over by shielding terminal lugs 14 extending parallel to the connection elements 4. All connection elements 4, 14 project over the metal structure 8 on the same upper side and extend parallel to each other.

Figure 2:
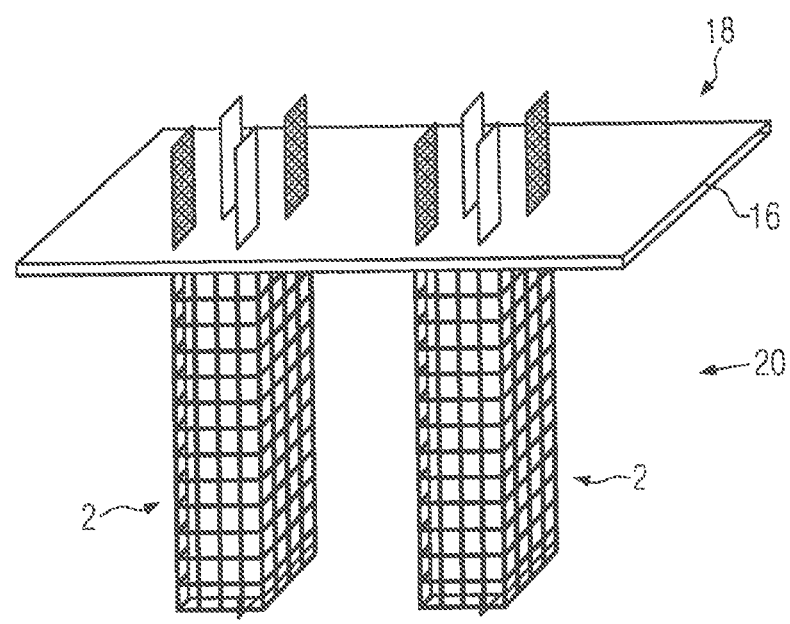
FIG. 2 shows essential components of an electrical heating device using the PTC heating element according to FIG. 1.

As shown in FIG. 2, this design allows each individual PTC heating element to be plug-connected with electrically conductive paths of a printed circuit board marked with reference sign 16. Thus, both the conductor paths of different polarity and the shielding terminal lugs 14 can be connected electrically in a simple manner. The printed circuit board 16 sketched in FIG. 2 is not equipped with electronic components. It has only elastic clamping elements, which are connected to conductive paths of the printed circuit board and are fittingly designed for insertion of the individual connection elements 4, 14. By inserting the connecting elements 4, 14, electrical contacting can be achieved easily. The printed circuit board 16 groups individual PTC heating elements 2 to form a heating circuit.

The printed circuit board 16 can be provided in a connection chamber of an electrical heating device not shown in detail. Details of such a design can be found, for example, in DE 10 2016 224 296 A1. In addition to this connection board 16, a further equipped circuit board can be provided in the connection chamber in order to control the individual heating circuits or PTC heating elements 2 individually.

The connection chamber mentioned above is indicated in FIG. 2 with reference sign 18. Below this is a circulation chamber 20 through which the liquid medium to be heated flows. This flowing medium is supposed to be water. The water flowing through the circulation chamber is swirled over the partially permeable metal structure 8 near the heat-emitting outer surface of the heating element housing 12, so that the heat transferred there can be better absorbed and dissipated by the water. As a result, the electromagnetic shielding in the form of the fluid-permeable metal structure 8 also results in better heat transfer and thus higher efficiency of the PTC heating element within the electrical heating device.

Figure 3:
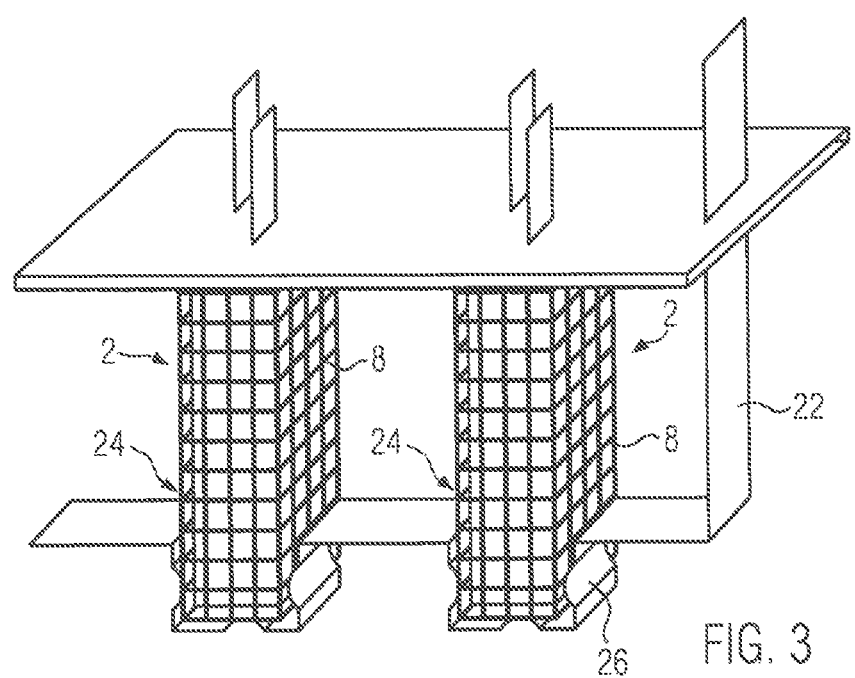
FIG. 3 shows a variant of the embodiment according to FIG. 2.
Figure 7:
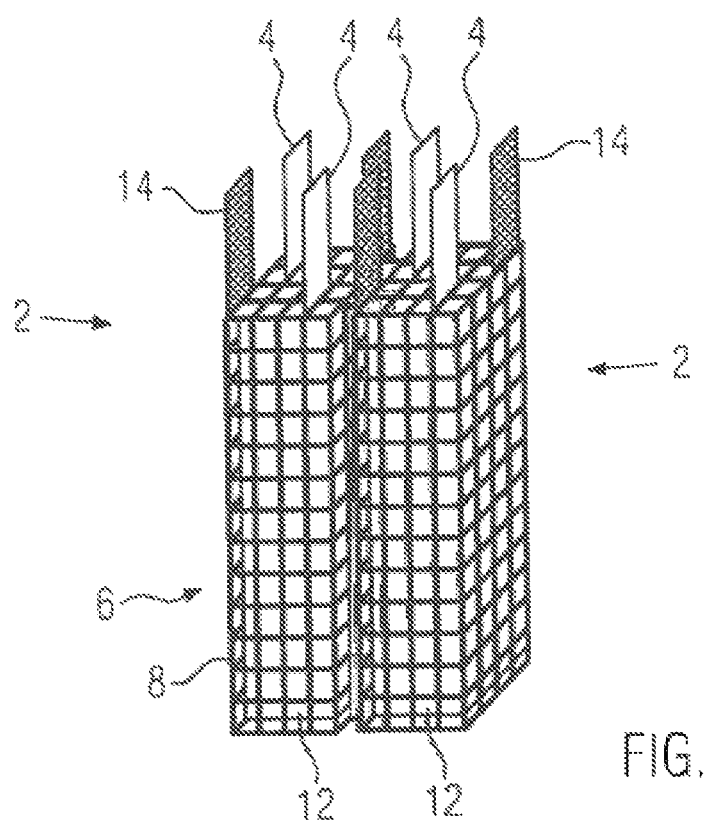
FIG. 7 is an isometric view depicting a plurality of PTC heating elements in a single cage.

An alternative connection diagram for the shielding is shown in FIG. 3. In this embodiment, a conductor rail marked with reference sign 22 forms U-shaped receptacles 24, each as such accommodating the free ends of the cage 6 from the metal structure 8. The U-shaped receptacles 24 have legs extending parallel to the main side surfaces of the PTC heating element, which form a contacting section 26 which is pre-bent convexly inwards and which lies against the outside of the cage with a certain elastic pretension. This creates a secure electrical contact between the conductor rail 22 and the metal structure 8.

The conductor rail 22 forms a shielding terminal lug marked with reference sign 28. This shielding terminal lug 28 is formed in one piece on the sheet metal material of the conductor rail 22 and, in the present case, is electrically contacted there by pushing it through the printed circuit board 16. However, such a contacting can also be dispensed with if the shielding terminal lug is inserted into the connection chamber and is, for example, plug-contacted there with a female plug-in element.

The embodiment shown in FIGS. 4 to 5 has a frame-shaped heating element housing 12, which also forms a sealing collar 30 which is molded thereon in one piece and can be sealingly inserted into a heater housing in the manner described in DE 10 2016 224 296 A3. As can be seen, the plastic material defining the outer surfaces of the heating element housing was injected around a holding frame 32 during injection molding of the heating element housing 12, which holding frame encloses the flat metal structure 8 at the edge in the present case. The corresponding holding frame 32 is first connected to the metal structure 8 and placed as an insert into the injection mold. The holding frame 32 thereby limits the cavity for forming the heating element housing 12 on the inner circumference.

The connection elements 4 are formed in the present case by elongated contact sheets 34, which lie against the PTC element 2 at the front end and supply power. A main side surface of the PTC element 2 marked with reference sign 36, which couples out the heat, is covered on the outside with an insulating layer 38, which is sealed into the material of the heating element housing 12 at the edge.

The sealing collar 30 is penetrated by a contact element 40 which is made of a sheet metal material by punching and bending and forms a contact section 42 projecting on both sides in the direction of the metal structure 8, which is electrically conductively connected to the metal structure 8. By connecting the shielding terminal lugs 14 formed by the contact element 40, it is possible to electrically connect the metal structure 8 provided on a main side surface 36 to a shielding pole.

The embodiment shown in FIGS. 4 to 6 has two identically formed contact sections 42, of which each is connected on the opposing main side surfaces 36 to the metal structure 8 respectively provided there as flat metal mesh and of which only the upper contact section 42 is shown.

We claim:

1. A PTC heating element comprising:
   at least one PTC element and two conductor paths which are assigned to different polarities, which are electrically conductively connected to the PTC element, and which are provided with connection elements for the electrical connection of the PTC element; and
   an electromagnetic shielding which is formed from a fluid-permeable metal structure and which surrounds the PTC element and the conductor paths.

2. The PTC heating element according to claim 1, wherein the PTC element and the conductor paths are accommodated, in a fluid-tight manner, in a heating element housing.

3. The PTC heating element according to claim 1, wherein electrical terminal lugs are electrically conductively connected to the conductor paths; and project over the shielding on the same sides in parallel alignment with one another.

4. The PTC heating element according to claim 3, wherein at least one shielding terminal lug is electrically conductively connected to the shielding, extends parallel to the electrical terminal lugs, and projects over the shielding.

5. The PTC heating element according to claim 1, wherein the shielding is spaced apart, at least in sections thereof, from a heat-emitting surface of the PTC element in such a manner that a flow gap is formed between the heat-emitting surface and the shielding.

6. The PTC heating element according to claim 5, wherein the heat-emitting surface is an outer surface of a heating element housing which accommodates the PTC element and the conductor paths in a fluid-tight manner.

7. The PTC heating element according to claim 1, wherein the electromagnetic shielding is accommodated in a holding frame which is initially produced separately from the electromagnetic shielding, which is connected to the electromagnetic shielding, and which is integrated into the heating element housing.

8. The PTC heating element according to claim 7, wherein the holding frame is connected to the heating element housing by way of injection molding.

9. An electrical heating device comprising:
   a heater housing which forms a circulation chamber and a connection chamber which is sealed in a fluid-tight manner with respect to said circulation chamber,
   at least one PTC heating element comprising at least one PTC element and two conductor paths which are assigned to different polarities, which are electrically conductively connected to the PTC element and are provided with connection elements for the electrical connection of the PTC element, and
   an electromagnetic shielding which is formed from a fluid-permeable metal structure and which surrounds the PTC element and the conductor paths, wherein a partition separating the circulation chamber from the connection chamber is penetrated by the connection elements of the at least one PTC heating element and by a shielding terminal lug, which is electrically connected to the shielding.

10. The electrical heating device according to claim 9, wherein the PTC element and the conductor paths are accommodated, in a fluid-tight manner, in a heating element housing.

11. The electrical heating device according to claim 9, wherein electrical terminal lugs are electrically conductively connected to the conductor paths and project over the shielding on the same sides in parallel alignment with one another.

12. The electrical heating device to claim 9, wherein at least one shielding terminal lug is electrically conductively connected to the shielding, extends parallel to the terminal lugs, and projects over the shielding.

13. The electrical heating device according to claim 12, further comprising a plurality of PTC heating elements, wherein the shielding terminal lug is formed by a conductor rail which electrically conductively connects the shieldings of the plurality of PTC elements to one another.

14. The electrical heating device to claim 9, wherein the shielding is spaced apart, at least in sections thereof, from a heat-emitting surface of the PTC element in such a manner that a flow gap is formed between the heat-emitting surface and the shielding.

15. The electrical heating device to claim 14, wherein the heat-emitting surface is an outer surface of a heating element housing which accommodates the PTC element and the conductor paths in a fluid-tight manner.

16. The electrical heating device according to claim 9, wherein the electromagnetic shielding is accommodated in a holding frame which is initially produced separately from the electromagnetic shielding, which is connected to the electromagnetic shielding, and which is integrated into the heating element housing.

17. The electrical heating device according to claim 16, wherein the holding frame is connected to the heating element housing by way of injection molding.

18. The electrical heating device according to claim 13, wherein the conductor rail forms a U-shaped receptacle in which the shielding is accommodated in an electrically conductive manner.

19. The electrical heating device according to claim 11, wherein a printed circuit board is provided in the connection chamber, which printed circuit board electrically conductively connects the terminal lugs of a plurality of PTC heating elements to one another.

20. The electrical heating device according to claim 12, wherein a printed circuit board is provided in the connection chamber, which printed circuit board electrically conductively connects the shielding terminal lug of a plurality of PTC heating elements to one another.

21. The electrical heating device according to claim 9, wherein a plurality of PTC heating elements are accommodated in a shielding cage formed from the fluid-permeable metal structure.

* * * * *